United States Patent [19]
Charles et al.

[11] 4,195,000
[45] Mar. 25, 1980

[54] IMPACT MODIFIED THERMOPLASTIC COPOLYESTER

[75] Inventors: John J. Charles, Bloomingdale; Robert C. Gasman, West Milford, both of N.J.

[73] Assignee: GAF Corporation, New York, N.Y.

[21] Appl. No.: 887,755

[22] Filed: Mar. 17, 1978

[51] Int. Cl.² ............ C08G 63/16; C08K 7/14; C08L 67/02
[52] U.S. Cl. ................ 260/22 D; 260/40 R
[58] Field of Search ..................... 260/22 D

[56] References Cited

U.S. PATENT DOCUMENTS

| | | | |
|---|---|---|---|
| 3,158,584 | 11/1964 | Layman | 260/22 D |
| 3,235,520 | 2/1966 | Crowell | 260/22 D |
| 3,383,343 | 5/1968 | Mohajer et al. | 260/22 D |
| 3,390,108 | 6/1968 | Keck et al. | 260/22 D |
| 3,498,940 | 3/1970 | Laganis | 260/22 D |
| 3,580,874 | 5/1971 | Nishimura | 260/22 D |
| 3,915,913 | 10/1975 | Jackson et al. | 260/22 D |
| 3,929,732 | 12/1975 | Shah | 260/22 D |
| 3,931,073 | 1/1976 | Jackson et al. | 260/22 D |
| 3,954,689 | 5/1976 | Hoeschele | 260/22 D |
| 3,962,154 | 6/1976 | Egli | 264/328 |

*Primary Examiner*—Ronald W. Griffin
*Attorney, Agent, or Firm*—Joshua J. Ward; Walter C. Kehm

[57] ABSTRACT

Molding composition comprising: (a) copolyester of (i) a polymethylene glycol having from 2 to 6 carbon atoms, (ii) a dimeric fatty acid and (iii) an aromatic dicarboxylic acid, wherein the dimeric fatty acid comprises from 1 to 30 wt. % of the copolyester, and; (b) from about 10 to about 45 wt. % of thermally stable reinforcing fibers such as glass fibers.

6 Claims, No Drawings

IMPACT MODIFIED THERMOPLASTIC COPOLYESTER

BACKGROUND OF THE INVENTION

Copolyesters of a polymethylene glycol, a dimeric fatty acid and an aromatic dicarboxylic acid are known, as exemplified for instance in U.S. Pat. Nos. 3,383,343 and 3,954,689. Such copolyesters have been suggested for various purposes including manufacture of elastomeric filaments and other elastomeric products such as tires, hose, wire coverings, etc. More specifically, the above mentioned patents suggest broadly elastomeric copolyesters containing from about 31 to about 65 weight percent (wt%) based on the copolyester of dimeric fatty acid.

Polybutylene terephthalate (PBT) reinforced with thermally stable reinforcing fibers such as glass fibers is well known as a molding resin and is described in numerous patents and publications including for instance U.S. Pat. Nos. 3,814,725, 3,814,786 and 3,624,024. Fiber reinforcement generally improves the tensile strength, flexural strength, flexural modulus and heat deflection temperature of the molding composition. However, moldings of fiber reinforced PBT frequently have less than desirable impact resistance for many applications.

SUMMARY OF THE INVENTION

It is an object of the present invention to provide an improved molding composition and injection molded articles of improved impact characteristics made from such composition.

Molding composition of the invention comprises:

(a) at least about 30 wt% of a copolyester of (i) a polymethylene glycol containing from 2 to 6 carbon atoms, (ii) dimeric fatty acid and (iii) an aromatic dicarboxylic acid comprising not more than 2 benzene rings wherein the two carboxyl groups do not occupy peri or ortho positions, said copolyester having an intrinsic viscosity between about 0.5 and about 1.5 dl/g and comprising between about 1 and about 30 wt% based on copolyester of dimeric fatty acid; and (b) between about 10 and about 45 wt% based on total molding composition of thermally stable reinforcing fibers having diameters between about 5 to about 20 microns and aspect ratios of at least about 5.

The invention also contemplates injection molded articles made from molding compositions of the invention.

In a preferred embodiment, the copolyester used in compositions of the invention is a copolyester of dimeric fatty acid, 1,4 butanediol and terephthalic acid and comprises between about 1 and about 30 wt% dimeric fatty acid and between about 70 and about 99 wt% butylene terephthalate units.

DETAILED DESCRIPTION OF THE INVENTION

As mentioned above, the composition of the invention includes a copolyester of a polymethylene glycol containing from 2 to 6 carbon atoms, a dimeric fatty acid and an aromatic dicarboxylic acid containing not more than 2 benzene rings wherein the carboxyl groups do not occupy peri or ortho positions.

Copolyesters suitable for use in the invention may be made by any suitable means such as by heating polyester forming functional derivatives, e.g., the dimethyl esters of the acids, with an excess of a polymethylene glycol and a suitable catalyst at an elevated temperature of e.g. 120° to 220° C. and at a pressure of for instance between about 150 mm of mercury and about atmospheric pressure until methanol ceases to be evolved. The temperature is then raised, e.g. to between about 235° and about 255° C. and the pressure reduced to sub-atmospheric, e.g. on the order of 1 mm of mercury or less. Heating may be continued until the resulting copolyester has an intrinsic viscosity in the range of between about 0.5 and about 1.5 deciliters per gram (dl/g). Intrinsic viscosity (I.V.) for purposes of the invention is measured in orthochlorophenol at 25° C. In accordance with the invention, dimeric fatty acid (or functional derivative thereof calculated as acid) is used in amounts between about 1 and about 30 wt% based on copolyester product.

As an alternate method of manufacture the dimeric fatty acid, rather than being included in the initial synthesis, may be added to the prepolymer oligomer stage shortly before initiation of the high vacuum polycondensation stage of the typical manufacuring process. Dimeric fatty acid may, for instance be added between about 30 and about 90 minutes prior to initiation of the polycondensation stage and is preferably added while the reaction is being maintained between about 150° and about 200° C. In either case, normal manufacturing times include between about 90 and about 150 minutes for the reaction at atmospheric pressure and between about 120 and about 180 minutes for the polycondensation stage of the reaction carried out at sub-atmospheric pressures. Use of this alternate method of manufacture frequently results in copolyester of higher I.V. than is obtained using the more conventional manufacturing method described above, and is therefore frequently preferred for applications where relatively higher I.V. of the copolyester is considered desirable.

Examples of polymethylene glycols suitable for use in copolyester used in the invention are ethylene glycol, trimethylene glycol, tetramethylene glycol (1,4-butanediol), and hexamethylene glycol (1,6-hexane diol).

As used herein, the term "dimeric fatty acid" includes hydrogenated dimeric fatty acids and polyester forming functional derivatives of fatty acids or hydrogenated fatty acids. Dimeric fatty acids suitable for use in the invention include for instance, dielaidic acid, dilinolenic acid, dilinoleic acid, dioleic acid, hydrogenated dilinolenic acid, dialkyl esters of above dimeric fatty acids, etc.

Suitable aromatic dicarboxylic acids include those containing 1 benzene ring, 2 benzene rings joined by a carbon-carbon link or by a divalent grouping, or a napthalene ring wherein the two carboxyl groups do not occupy peri or ortho positions, as well as polyester forming functional derivatives of such acids. Suitable aromatic dicarboxylic acids include for instance:
terephthalic acid
4,4'-dicarboxydiphenyl
isophthalic acid
4-methylisophthalic acid
4,4'-dicarboxydiphenylmethane
4,4'-dicarboxydiphenylethane
ethylene bis(4-oxybenzoic acid)
tetramethylene bis(4-oxybenzoic acid)
4,4'-dicarboxydiphenyl sulphide
4,4-dicarboxydiphenyl sulphone
2,3'-dicarboxydiphenyl sulfphone 2,6-dicarboxynaphthalene
1,5-dicarboxynaphthalene
2,7-dicarboxynaphthalene
1,6-di(p-carboxy benzamido)-hexane
4,4'-dicarboxy diphenyl carbonyl Copolyesters useful in the invention may also be made by other suitable means such as by heating together in a vacuum the diglycol esters of the dimeric fatty acid and of the aromatic acid until a copolyester of the desired intrinsic viscosity is obtained.

In the manufacture of copolyester of the invention, a suitable catalyst is normally used for the condensation polymerization of the glycol and dicarboxylic acids. Suitable catalysts include metals, alkali metal oxides, boron trioxide, lead acetate, calcium acetate, antimony compounds such as antimony trioxides, titanium compounds such as tetraisopropyl titanate, etc.

A particularly preferred dimeric fatty acid for use in making copolyesters of the invention is dimer acid having a molecular weight of about 565. Such dimer acid is the dimerization product of unsaturated C-18 fatty acids such as linoleic and linolenic acid or esters thereof. The preferred dimer acid compositions are substantially free of monomer and trimer fractions (i.e. contains less than about 5 wt% of such fraction) and are highly saturated. A high quality grade of dimer acid meeting these requirements is commercially available under the trade name EMPOL 1010. Lower grades of dimer acid containing up to e.g. 15% by weight of monomer and trimer are also available and can be used but are not considered as satisfactory for the practice of the invention.

Polybutylene terephthalate (PBT) used in the invention may be produced in any suitable manner such as by reacting terephthalic acid or a dialkyl ester of terephthalic acid, e.g., dimethyl terephthalate, with diols having four carbon atoms, e.g., tetramethylene glycol. PBT for use in the invention has an intrinsic viscosity (I.V.) between about 0.5 and about 1.5 dl/g measured in orthochlorophenol at 25° C. Manufacture of PBT is well known to those skilled in the art as are the techniques for obtaining PBT of desired intrinsic viscosity. Such conventional production techniques for PBT are discussed in greater detail for instance in U.S. Pat. No. 3,465,319.

Thermally stable reinforcing fibers used in the invention may be any such fibers which are thermally stable at the conditions normally used in the production of products from PBT molding compositions and include for instance fibers of materials such as glass, asbestos, carbon, fibrous potassium titanate, iron whiskers, etc. Such fibers should normally have diameters between about 5 and about 20 microns and aspect ratios (ratio of length of fiber to diameter of fiber) of at least about 5. Glass fibers are preferred for use in the invention. Glass fibers, where used, preferably have diameters between about 10 and about 15 microns and aspect ratios of at least about 20.

Reinforcing fibers used in the invention are normally used in amounts between about 10 and about 45 wt% based on total weight of molding composition. Glass or other fibers for use in the invention may be incorporated into the composition of the invention in any suitable manner, such as by compounding extrusion with other ingredients of the compositions of the invention or incorporating into the composition during injection molding of products from the composition of the invention.

In manufacturing injected molded products from compositions of the invention, it has been noted that increasing the amount of dimeric fatty acid used in the copolyester portion of the composition generally increases the impact strength of finished products as measured by both the notched and unnothced Izod tests. It has, however, also been noted that if more than about 30 wt% dimeric fatty acid based on copolyester is used, the heat deflection temperature of the resulting product is adversely affected to the point where the product is considered unsatisfactory for many uses. In general, for fiber reinforced products of the type generally contemplated herein heat deflection temperatures of at least about 165° C. are preferred.

It has further been noted that when relatively large amounts of thermally stable reinforcing fibers are used; i.e., amounts of between about 35 and about 45 wt% of the composition, the unnotched Izod impact strength of molded test specimens is adversely affected by the use of dimeric fatty acid in the copolyester component in amounts less than about 25 wt% of the copolyester. Accordingly, in a preferred embodiment of the invention, dimeric fatty acid is used in amounts between about 25 and about 30 wt% based on copolyester in compositions of the invention containing between about 35 and about 45 wt% reinforcing fibers. In another preferred embodiment of the invention, dimeric fatty acid is used in amounts between about 1 and about 25 wt% based on copolyester in compositions of the invention containing between about 10 and about 35 wt% reinforcing fibers.

In addition to the thermally stable reinforcing fibers discussed above, compositions of the invention may also include inert, particulate filler material in amounts up to about 40 wt% of the composition. Particulate filler suitable for use in the invention is usually in the form of particles in the general size range of between about 0.2 and about 20 microns and usually has aspect ratios less than about 5. Suitable materials include for instance such conventional fillers as glass spheres, clay, silica, silicates, alumina, etc. Compositions of the invention may also be alloyed with suitable amorphous thermally-stable resins such as polymethyl methacrylate, poly(butyl acrylate-co-methyl methacrylate), poly(ethyl acrylate-co-methyl methacrylate), polycarbonate, polysulfones, etc.

Compositions of the invention may also contain suitable flame-retardant additives in amounts up to about 20 wt% based on total composition and may contain relatively minor amounts of other materials which do not unduly affect the desired characteristics of the finished product. Such additional materials may, depending upon the particular compositions employed and products desired, include for instance, colorants, lubricants, plasticizers, stabilizers, etc. Where present, such additional materials normally comprise no more than about 5 wt% of the total composition of finished product.

The following example is intended to illustrate the invention without limiting the scope thereof.

EXAMPLE

In order to evaluate physical characteristics, especially impact strengths and heat deflection temperatures, of molded articles made from compositions of the invention, various compositions having amounts of dimer acid and glass fibers as shown in Table I below were prepared and used in the preparation of molded test specimens. The test specimens were then tested to determine impact strengths and heat deflection temperatures.

The composition identified in Table I as composition No. 4 was formulated by charging the following ingredients at room temperature to a one-gallon reactor fitted with high viscosity agitator, vacuum removal system, nitrogen pressure equalizer, flush bottom valve and temperature and viscosity monitoring systems:

Dimethyl terephthalate 1446 g
1,4-butanediol 976.5 g
Tetraisopropyl titanate 1 g The system was sealed, a vacuum of 150 mm mercury was applied and temperature was slowly raised to 200° C. over 90 minutes. Agitation was begun at about 130° C. and continued for the duration of the experiment. At 200° C., the amount of EMPOL 1010 dimer acid necessary to have the dimer acid constitute the desired portion of the copolyester of the invention was charged by shutting off the vacuum equalizing pressure to atmospheric with dry nitrogen gas, opening the reactor, charging the dimer acid, resealing the reactor and reapplying vacuum. Temperature was maintained at 200° C. plus or minus 10° C. until no more volatiles were removed, at which time vacuum was increased to less than 1 mm mercury and temperature was raised to 245° C. plus or minus 5° C. The reaction was continued until the desired intrinsic viscosity was reached (as indicated by torque) and the contents of the reactor was then discharged. For these compositions, intrinsic viscosities ranged between 0.5 and 1.0 dl/gm.

Thermally stable reinforcing fibers in the form of glass fibers having an average diameter between about 5 and about 20 microns and an average aspect ratio of at least 5 were incorporated in the resin formed as described above by compounding on a Midland Ross 1.5 inch extruder using the following conditions:

Temperature 240°–255° C.
Pressure 0–2000 psi
Amperage 10–12
Screw RPM 75

The pelletized, reinforced extrudate was then molded on a 3-oz. 50 ton reciprocating screw VanDorn molding machine into 150 inch tensile and flex bars and tested in accordance with ASTM D-256 for notched Izod impact strength and cantilever beam reversed notch Izod impact strength as well as for heat deflection temperature in accordance with ASTM D-648. Molding was carried out at a temperature of 430°–480° F. and a pressure of 500–1,000 psi with an injection cycle of 5–15 seconds and a mold closed cycle of 10–25 seconds. Results of these tests were shown in Table I below.

The other compositions referred to in Table I were made and tested in the same manner except that the proportions of ingredients were varied as needed to obtain products having the amounts of dimer acid and glass fibers reported in Table I.

While the invention has been described above with respect to certain embodiments thereof, it will be understood by those skilled in the art that various changes and modifications may be made without departing from the spirit and scope of the invention.

TABLE I

PROPERTIES OF EXPERIMENTAL COMPOSITIONS AND TEST SPECIMENS

| Composition No. | Dimer Acid (EMPOL 1010) Wt % Based on Copolyester | Glass Fibers Wt % Based On Total Composition | Impact Strength Notched Izod ft lb/in. | Cantilever Beam Reversed Notched Izod ft lb/in. | Heat Deflection Temperature °C. |
|---|---|---|---|---|---|
| 1 | 0 | 30% | 1.78 | 9.67 | 210 |
| 2 | 8% | 30% | 2.55 | 11.77 | 194 |
| 3 | 10% | 30% | 2.12 | 11.24 | 188 |
| 4 | 25% | 30% | 3.56 | 12.3 | 175 |
| 5 | 39% | 30% | 5.33 | 16.13 | 144 |
| 6 | 46% | 30% | 6.24 | 20.10 | 109 |
| 7 | 60% | 30% | 5.41 | 15.80 | 66 |
| 8 | 0 | 40% | 2.24 | 12.55 | 207 |
| 9 | 10% | 40% | 1.86 | 9.12 | 199 |
| 10 | 12% | 40% | 1.86 | 7.87 | 198 |
| 11 | 15% | 40% | 1.90 | 9.26 | 196 |
| 12 | 18% | 40% | 2.03 | 9.00 | 191 |
| 13 | 21% | 40% | 2.18 | 9.92 | 189 |
| 14 | 28% | 40% | 2.88 | 11.30 | 184 |
| 15 | 32% | 40% | 3.25 | 12.78 | 161 |

What I claim is:

1. Molding composition comprising:
   (a) at least about 30 wt% of a copolyester of dimeric fatty acid, 1,4-butanediol and terephthalic acid, which copolyester contains between about 25 and about 30 wt% based on copolyester of dimeric fatty acid selected from the group consisting of dioleic, dilinoleic and dilinolenic acids and dialkyl esters of such acids and between about 70 and about 75 wt% based on copolyester of butylene terephthalate units, said copolyester having an intrinsic viscosity between about 0.5 and about 1.2 dl/g; and
   (b) between about 35 and about 45 wt% based on total molding composition of glass reinforcing fibers having diameters between about 5 and about 20 microns and aspect rations of at least about 5.

2. Molding composition of claim 1 wherein the dimeric acid has a molecular weight of about 565.

3. An injection molded article made from the molding composition of claim 1 and having a heat deflection temperature of at least about 165° C.

4. Molding composition comprising:
   (a) at least about 30 wt% of a copolyester of dimeric fatty acid, 1,4-butanediol and terephthalic acid, which copolyester contains between about 1 and about 25 wt% based on copolyester of dimeric fatty acid selected from the group consisting of dioleic, dilinoleic and dilinolenic acids and dialkyl esters of such acids and between about 75 and about 99 wt% based on copolyester of butylene terephthalate units, said copolyester having an intrinsic viscosity between about 0.5 and about 1.2 dl/g; and (b) between about 10 and about 35 wt% based on total molding composition of glass reinforcing fibers having diameters between about 5 and about 20 microns and aspect ratios of at least about 5.

5. Molding composition of claim 4 wherein the dimeric fatty acid has a molecular weight of about 565.

6. An injection molded article made from the molding composition of claim 4 and having a heat deflection temperature of at least about 165° C.

* * * * *